(12) United States Patent
Linehan

(10) Patent No.: US 7,103,575 B1
(45) Date of Patent: Sep. 5, 2006

(54) ENABLING USE OF SMART CARDS BY CONSUMER DEVICES FOR INTERNET COMMERCE

(75) Inventor: Mark Holmes Linehan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 09/653,078

(22) Filed: Aug. 31, 2000

(51) Int. Cl.
G06F 17/60 (2006.01)

(52) U.S. Cl. .............. 705/64; 705/44; 705/26; 235/379; 235/380

(58) Field of Classification Search ............ 705/64, 705/44, 26; 235/379, 380
See application file for complete search history.

(56) References Cited

U.S. PATENT DOCUMENTS

| | | | |
|---|---|---|---|
| 5,428,684 A | * 6/1995 | Akiyama et al. | 705/66 |
| 5,715,314 A | * 2/1998 | Payne et al. | 705/78 |
| 5,724,424 A | * 3/1998 | Gifford | 705/79 |
| 5,815,577 A | 9/1998 | Clark | 380/52 |
| 5,887,065 A | 3/1999 | Audebert | 380/23 |
| 6,529,880 B1 | * 3/2003 | McKeen et al. | 705/17 |

FOREIGN PATENT DOCUMENTS

GB 2118341 A * 11/1984
WO 9900775 1/1999

OTHER PUBLICATIONS

Financial Cryptography First International Conference, FC '97. Proceedings pp. 123–134, published Berlin, Germany, 1997, —abstract—.

* cited by examiner

*Primary Examiner*—James P. Trammell
*Assistant Examiner*—James A. Reagan
(74) *Attorney, Agent, or Firm*—Gregory M. Doudnikoff; Marcia L. Doubet; Martin J. McKinley

(57) ABSTRACT

A method, system, and computer readable code for enabling use of smart cards by consumer devices for Internet commerce. This is achieved by integrating an existing "Integrated Circuit Card Specification for Application Payment Systems" standard (commonly known as the "EMV" standard) with an augmented version of the Four-Party Credit/Debit Payment Protocol which was disclosed in U.S. Pat. No. 6,327,578. The result of the integration allows a consumer to use a smart card from a personal computer system for credit or debit transactions, while preserving the level of security and other features required by the credit card associations and banks. No modifications are required to the existing EMV standard or existing EMV smart cards.

32 Claims, 7 Drawing Sheets

EMV Environment

Integration of EMV With 4 Party Protocol

Dynamic Data Authentication in Standard EMV

Dynamic Data Authentication with Integrated Environment

Online Authorization in Standard EMV

Online Authorization with Integrated Environment

Four-Party Credit/Debit Protocol

ENABLING USE OF SMART CARDS BY CONSUMER DEVICES FOR INTERNET COMMERCE

BACKGROUND OF THE INVENTION

1. Field of the Invention

The present invention relates to a computer system, and deals more particularly with a method, system, and computer program product for enabling use of smart cards by consumer devices for Internet commerce. This is achieved by integrating an existing "Integrated Circuit Card Specification for Application Payment Systems" standard (commonly known as the "EMV" standard) with an augmented Four-Party Credit/Debit Payment Protocol disclosed in U.S. Pat. No. 6,327,578.

2. Description of the Related Art

Using the Internet and World Wide Web (where the World Wide Web, hereinafter "Web", is a subset of the Internet) for "on-line shopping" with a credit or debit card, a consumer today is able to purchase items from merchants around the corner, as well as from merchants around the globe and anywhere in between, all from the comfort of the consumer's own home. (Hereinafter, the terms "Internet" and "Web" are used interchangeably unless otherwise noted.) A consumer navigates to a merchant's Web site, and typically browses one or more Web pages to select goods or services to purchase. The consumer uses a credit or debit card for an on-line shopping transaction by supplying the card number to the merchant-for the amount of the purchase. There are various methods for supplying the consumer's card information, including the use of "electric wallet" software which is becoming common on many systems. An electronic wallet, which is often referred to simply as a "wallet", is software which securely stores the consumer's card information (and may also store other information such as the consumer's name and billing address). When a purchase is made over the Internet, the wallet software provides the consumer's personal information to the merchant as part of the purchasing transaction, thereby relieving the consumer of the burden of remembering and retyping the stored information for each transaction. The wallet software typically executes on the consumer's computing device, and is invoked in response to a message from the merchant after the consumer indicates he or she wishes to make a purchase. The result of using the wallet software is essentially the same as using a telephone to order products from a merchant and verbally exchanging information such as card number, name, address, etc. (Server-based wallet software implementations are also known in the art, where the wallet software operates either entirely or partly on a network-based server. These wallets are accessed over the network by the consumer's browser or by thin-client software that, at a minimum, assures authentication of the consumer.)

U.S. Pat. No. 6,327,578 (Ser. No. 09/221,869, filed Dec 29, 1998), which is titled "Four-Party Credit/Debit Payment Protocol" and which is incorporated herein by reference, teaches a technique for efficiently authorizing credit and debit card transactions for a consumer when shopping on the Internet. (This invention is referred to hereinafter as "the related invention", and the protocol disclosed therein is hereinafter referred to as "the 4-party protocol".) The authorization process is performed between a consumer (using his or her credit or debit card and a consumer device such as a personal computer, or "PC") and the bank that issued the consumer's card (hereinafter referred to as the "issuing bank" or "issuer"). This is in contrast to prior art techniques, as will now be described.

Without the use of this 4-party protocol, authorization is more complex and requires much more system overhead (as described in the related invention). The techniques existing in the prior art, before the related invention, began by the consumer indicating to the merchant that he or she wished to purchase an item, after which the merchant requested the credit or debit card information from the consumer either directly (e.g. by sending a Web page into which the consumer would fill in the blanks) or by sending an initialization message to start the consumer's wallet software. When the merchant received the card information, either from the returned Web page or from the wallet software, the merchant would then request an authorization for the transaction from the issuing bank by routing the authorization request through the bank used by the merchant for card transactions (hereinafter referred to as the "acquiring bank"), through a private card network (operated by MasterCard®, Visa®, or a similar company or card association), and finally to the issuing bank. Once the transaction was authorized by the issuing bank, the authorization was routed back over the card network to the acquiring bank and then to the merchant. The merchant then indicated to the consumer that the purchase was approved. At some later point in time, the merchant sent the necessary information to the acquiring bank to collect the funds from the issuing bank. ("MasterCard" is a registered trademark of MasterCard International Incorporated, and "Visa" is a registered trademark of Visa International Service Association.)

One key advantage of using the 4-party protocol is the ability to send a "pre-authorized" payment message from the consumer's wallet to the merchant. By using the 4-party protocol, the consumer's computing device (which will be referred to as a PC hereinafter, for ease of reference) interacts directly with the issuing bank to perform the authorization, instead of the merchant requesting the authorization as in the prior art. When the issuing bank has authorized the transaction, it sends an "authorization token" (which is the pre-authorized payment message) to the consumer's PC, which is then forwarded to the merchant as part of the payment response from the consumer's wallet. The merchant need not perform a separate real-time authorization of the card information since the transaction has already been approved by the issuing bank. (The merchant at some later time forwards the authorization token to the acquiring bank to use for requesting the funds from the issuing bank.)

A new type of card has emerged in recent years that is designed to be more secure than existing credit and debit cards. This card is referred to as a "smart card". This smart card includes a logic chip that contains stored information pertaining to the owner, such as the owner's name, address, and account number; the card issuer (such as Mastercard, Visa, etc.); a Personal Identification Number (PIN); and any limitations on the card's use (such as a dollar maximum used for an individual purchase). A standard titled "Integrated Circuit Card Application Specification for Payment Systems" specifies how credit and debit card systems may use smart cards for point-of sale (POS) retail purchases and automated teller machine (ATM) transactions. This standard was promulgated by three of the leaders in the charge card industry: Europay International, Master, and Visa. Because of the involvement of these parties in drafting the standard, the card standard is commonly referred to as the "EMV" standard. (The most recent version of the EMV standard is version 3.1.1, dated May 31, 1998, which may be found on the Internet.

The smart card is designed for use in a device attached to a POS terminal (or ATM) which is physically located at a merchant's business. Instead of "swiping" the card (as with current credit and debit cards that contain a magnetic stripe), the merchant or consumer will plug the smart card into a smart card reader. Power is then supplied to the card by the POS terminal (or ATM), and information is exchanged between the terminal and the smart card to enable a consumer to perform a transaction. (Hereinafter, smart cards are discussed with reference to use with a POS terminal. These discussions apply equivalently to use of a smart card with an ATM unless stated otherwise.)

According to the EMV standard, there are two types of authorization interaction that may occur between the smart card and the merchant. The first type of authorization is "off-line authorization", where logic on the card directly approves the transaction using information available from the smart card and POS terminal. This may occur, for example, when the transaction amount and other parameters fall within risk management guidelines established by the card issuer, merchant, and acquirer. The second type of authorization is "on-line authorization", where the transaction must be authorized by the issuing bank using a message sent from the card, through the POS terminal, the acquiring bank, the appropriate card network (i.e. MasterCard, Visa, etc.) and finally to the issuing bank. The transaction is either approved or declined in a response message sent from the issuing bank via the card network to the acquiring bank, to the merchant's POS terminal, and ultimately to the consumer's smart card. Following a successful transaction (i.e. when the consumer is authorized for the transaction), a message is eventually transmitted from the merchant to the acquiring bank to actually collect the funds associated with the transaction from the issuing bank.

The EMV standard is defined for use with POS terminals which are physically located at a merchant's business, as previously stated. The standard presumes the POS terminal can be trusted to perform a number of critical security functions such as the authorization of transactions. Because a consumer device is under control of the consumer, responsibility for these security functions must be moved elsewhere, and thus the existing EMV standard does not directly adapt to use of smart cards in conjunction with Internet purchases (where the physical merchant POS terminal does not exist). Furthermore, the existing EMV standard fails to take advantage of the global connectivity of the Internet when performing transaction authorization.

Accordingly, what is needed is a technique which allows consumers to purchase items from a consumer computing device over the Internet using smart card technology, but without requiring modification of the existing EMV standard or of existing smart cards.

SUMMARY OF THE INVENTION

An object of the present invention is to provide a technique for using a smart card in conjunction with a consumer computing device to purchase goods or services from a merchant over the Internet.

Another object of the present invention is to provide this technique without requiring modification of the existing EMV standard.

Still another object of the present invention is to provide this technique without requiring modification of existing smart cards.

Yet another object of the present invention is to provide this technique by integrating the functions prescribed by the EMV standard with the 4-party protocol.

A further object of the present invention is to provide this technique whereby responsibility for performing trusted functions is moved to the smart card issuer.

Still another object of the present invention is to increase efficiency of authorizing smart card transactions for Internet on-line shopping by taking advantage of the consumer's ability to directly connect to the smart card issuer.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, system, and method for enabling use of smart cards by consumer devices for Internet commerce. This technique comprises: initiating a transaction with a merchant using a smart card which is accessible directly from a consumer device; sending, via the consumer device, an authenticated authorization request message from the smart card to an issuer of the smart card; obtaining, by the consumer device, an authenticated authorization for the transaction directly from the issuer of the smart card; verifying the authentication of the authorization, and including the authorization in a payment message which corresponds to the transaction and which is sent from the consumer device to the merchant.

The initiating preferably further comprises: sending a transaction request from the consumer device to the merchant; receiving the transaction request at the merchant; sending a payment initiation message for the transaction, responsive to the transaction request, from the merchant to the consumer device, wherein the payment initiation message comprises a transaction amount, a time stamp, a random nonce, and data required by the smart card; and receiving the, sent payment initiation message by the consumer device.

Sending the authenticated authorization request message preferably further comprises: sending a message from the consumer device to the smart card, causing the smart card to use on-line authorization; receiving, by the consumer device, an authorization request (AR) from the smart card, wherein the AR comprises a card account number for the transaction, an amount of the transaction, a date of the transaction, and a serial number of the smart card; creating an authenticated authorization request message by augmenting the received payment initiation message with the AR; and sending the authenticated authorization request message directly from the consumer device to the issuer. Obtaining the authenticated authorization preferably further comprises: receiving the sent authenticated authorization request message at the issuer; creating, at the issuer, responsive to receiving the sent authenticated authorization request message, an authorization token for the transaction; creating issuer authentication data by the issuer, as well as optional issuer commands; sending the authorization token from the issuer to the consumer device, along with the issuer authentication data and the optional issuer commands; and receiving the sent authorization token, the issuer authentication data, and the optional issuer commands by the consumer device. Creating the authorization token preferably further comprises: verifying the card account number; verifying an ability of an account corresponding to the smart card to cover the amount; and authorizing the transaction if the verifications have a positive result.

Including the authorization preferably further comprises: passing the received issuer authentication data and optional issuer commands from the consumer device to the smart card; receiving, by the consumer device, a transaction certificate (TC) from the card; forwarding the TC and the received authorization token from the consumer device to the merchant as the payment message; receiving the payment message at the merchant; sending, responsive to receiving the payment message, a capture request from the merchant to an acquiring bank, along with the payment message; receiving the capture request and the payment message at the acquiring bank; and charging, responsive to receiving the capture request and the payment message, the account corresponding to the smart card for the transaction.

The payment message may further comprise the authorization token. The payment message may alternatively further comprise one or more responses to the optional issuer commands.

The present invention will now be described with reference to the following drawings, in which like reference numbers denote the same element throughout.

DESCRIPTION OF THE PREFERRED EMBODIMENTS

Figure 1:
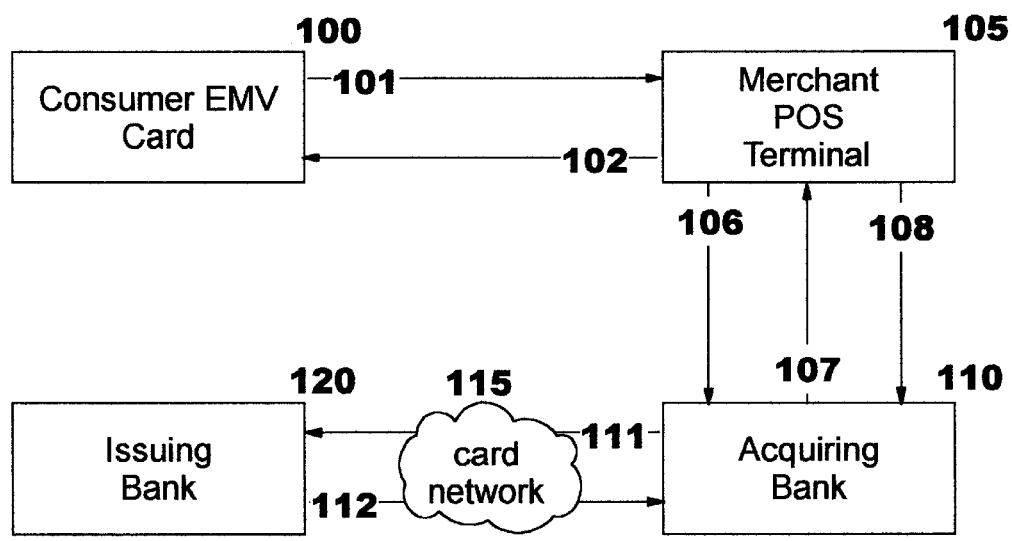
FIG. 1 illustrates the EMV environment of the prior art.

The present invention enables consumers to make purchases (and to perform other types of on-line financial transactions) over the Internet using a smart card which is processed by a smart card reader attached to a consumer computing device such as a PC. (Note that while the present invention is described with reference to using a PC, this is for purposes of illustration and not of limitation. Other devices may be used alternatively, provided that the consumer device has a smart card reader, a processor, memory, a keyboard, and a display. These capabilities are found in many alternative consumer devices, any of which could support the functions of the present invention. Examples include set-top boxes used for cable or satellite television access, screen phones, cellular phones, and personal digital assistants or "PDAs".) This is accomplished by integrating the smart card EMV protocol with the 4-party protocol which is defined in the related invention. By augmenting the information transmitted in the 4-party protocol, the present invention enables use of existing smart cards and avoids change to the existing EMV standard. In the existing EMV environments where smart cards are used in merchant POS terminals or ATMs, there is an inherent trust in the function provided by the POS or ATM (e.g. to properly evaluate risk parameters). When the consumer's computing device replaces the POS or ATM, this inherent trust no longer exists because of the relative ease with which a consumer could misuse the device. Accordingly, responsibility for the critical functions is moved elsewhere according to the present invention, as will be demonstrated.

The preferred embodiments of the present invention will now be discussed with reference to FIGS. 1 through 7.

In the preferred embodiments, the present invention is implemented as one or more modules (also known as "objects" in object-oriented programming languages) of one or more computer software programs. This computer software will be used in an environment where a consumer is interacting with a merchant over the Internet for purchasing items (or performing other financial transactions) using a smart card. The consumer computing device in use must provide an interface for using a smart card, as defined by the EMV standard.

Before discussing the present invention in detail, the existing EMV environment will now be described. The manner in which the present invention provides equivalent functionality, and achieves equivalent security, will then be explained.

EMV cards, or smart cards, are issued by banks to their cardholders to reduce fraud in consumer credit- and debit-card purchases. The EMV standard specifies a smart card application used to perform a number of functions, including:

- Off-line authorization for credit or debit card payments, when the payment amount and other parameters fall within risk management guidelines established by the card issuer, merchant, and acquirer. "Authorize" means that the merchant is guaranteed the payment, regardless of whether the cardholder pays the card issuer. "Off-line authorize" means that the authorization occurs solely using data available in the smart card and merchant terminal. (Off-line authorization. is not necessary, and is not supported, when using the present invention.)
- On-line authorization for payments that fall outside the risk management guidelines. On-line authorization means that the merchant's POS terminal obtains payment approval from the issuing bank. (On-line authorization is supported when using the present invention.)
- Authentication of the smart card, to discourage counterfeits. EMV has two variations of this Data Authentication function: static data authentication and dynamic data authentication. Static data authentication uses a digital signature generated by the card issuer at the time the credit or debit account number is placed in the card. Dynamic data authentication uses a digital signature dynamically generated by the smart card itself at the time of each payment. (Note that card authentication is implicitly performed by EMV on-line authorization, so static and dynamic data authentication are not entirely necessary in the context of the present invention. Nevertheless, both types of data authentication are supported.)
- Authentication of the cardholder using one of several Cardholder Verification Methods (CVMs). A common CVM is off-line PIN processing, where the cardholder enters a PIN that is locally verified by the smart card. An alternative is on-line PIN processing, where the cardholder enters a PIN that is encrypted and sent to the issuer for verification. Other alternatives include paper signatures or biometrics. (Off-line PIN processing, on-line PIN processing, and biometrics are all supported when using the present invention. Paper signatures are not supported.)

PIN Encryption for PINs sent from a secure PIN keypad through a terminal to a smart card. This ensures that PINs cannot be extracted from the transmission path between the keypad and the card. (PIN encryption is supported when using the present invention.)

Issuer scripts, which are commands transmitted from an issuing bank, through an acquiring bank and merchant, to the cardholder. These commands can perform various functions, such as resetting an off-line PIN retry count, disabling a card, and disabling individual card functions. The commands in issuer scripts provide a method for issuers to manage their population of EMV cards. (Issuer script processing is supported when using the present invention.)

The manner in which the protocol defined in the existing EMV standard operates when used at a POS terminal or ATM will now be described in more detail, using processing steps of the protocol. The steps include:

A. Initiate Application: The cardholder inserts the smart card in the POS terminal. The terminal senses the presence of the card, and supplies power. The card produces an Answer to Reset message which provides details about the card's capabilities. The terminal and card exchange messages. in which the terminal verifies that the card has an EMV payment application, selects that application for further processing, and reads various data from the card. The terminal initiates the application, issuing a GET PROCESSING OPTIONS command to pass Processing Data Options List (PDOL) data to the card and retrieve-various data from the card. The PDOL contains data requested by the card, such as the amount of the transaction, terminal capabilities, Acquirer Identifier, Merchant Identifier, etc.

B. Read Application Data: The terminal reads various data from the card, according to parameters previously provided by the card.

C. Data Authentication: The terminal may perform either static data authentication or dynamic data authentication to verify that the card is legitimate. The choice of which to perform is dependent upon both card and terminal capabilities.

In static data authentication, the issuer has digitally signed various data carried by the card. The terminal reads this data and the issuer's signature, and verifies the issuer's signature using an issuer certificate provided by one of several known certificate authorities. The public keys of the known certificate authorities must be pre-stored in the terminal. This verifies that the card contains valid issuer data.

Dynamic data authentication according to the prior art is described in detail below, with reference to FIG. 3A.

D. Processing Restrictions: The terminal verifies'various processing restrictions, such as checking the compatibility of the EMV application in the smart card, and checking the card application version number, certain usage controls, and the card expiration date. In standard EMV, the processing restrictions are applied by the merchant POS terminal.

E. Cardholder Verification: Cardholder verification is an optional procedure which may be used to verify that the authorized cardholder is present. It can be performed by off-line PIN processing, on-line PIN processing, paper signature, or biometrics.

If off-line PIN processing is required by the card, the terminal prompts the user to enter the PIN. The PIN can be entered either via the PC keyboard or via a secure PIN keypad incorporated in the smart card reader. The PIN is transferred to the card, which verifies that the correct PIN is supplied. The card then responds positively or negatively to the POS terminal. (If supported by the card, the PIN may be encrypted before transfer to the card; to ensure that the PIN cannot be read from the terminal.) If on-line PIN processing is required by the card, the terminal prompts the user to enter the PIN. The PIN is encrypted and passed from the merchant POS terminal through the acquirer and card network to the issuing bank. The encryption and PIN handling is performed with DES (data encryption standard) symmetric keys, according to ISO (International Organization for Standardization) standard 9564. (ISO 9564 is entitled "Banking—Personal Identification Number management and security", and was published as a standard in 1996.) The merchant POS terminal must share a pre-arranged symmetric key with the acquirer for this purpose.

F. Terminal Risk Management: This is a set of tests performed by the terminal to determine whether on-line authorization is required. For example, on-line authorization may be required if the transaction amount exceeds a specified limit. (Rather than performing the typical EMV Terminal Risk Management steps, the PC always performs on-line authorization when using the present invention.)

G. Terminal Action Analysis: The terminal makes a preliminary decision whether to decline the transaction, authorize on-line, or attempt off-line authorization. The terminal issues a GENERATE AC command to the card. Parameters within this command indicate how the terminal wishes to proceed. The terminal can force on-line authorization via parameters in the GENERATE AC command. (Note that this ability to force on-line authorization for any transaction requires all existing smart cards and all existing EMV implementations to support on-line authorization processing, and thus the on-line authorization which is required when using the present invention does not require implementation of additional features. Forcing on-line authorization places the responsibility for authorizing or declining the transaction with the issuer that will be liable for the payment.)

H. Card Action Analysis: The card decides how to proceed based on the input from the terminal and policies of the issuer. In the case of on-line authorization, the card returns an Authorization Request Cryptogram (ARQC) to the terminal. The ARQC may be digitally signed by the card, using either asymmetric or symmetric cryptography. It includes data such as the card account number, the amount of the transaction, the date, a serial number for the card, and other information.

I. On-line Processing: The terminal sends the ARQC to the issuer via the acquirer and the card network. The issuer verifies the digital signature on the ARQC to assure the presence of an authentic smart card in the transaction. The issuer checks its account records to determine whether the transaction amount fits within account limits, and sends an approval or disapproval in the form of Issuer Authentication Data. The Issuer Authentication Data may be digitally signed by the issuer, using either asymmetric or symmetric cryptography. (Alternatively, if on-line PIN processing is used, the encrypted PIN from step E is sent to the issuer for verification in this step.)

J. Issuer Authentication: The terminal passes the Issuer Authentication Data to the card with a second Generate AC or an External Authenticate command, and the card responds with a Transaction Certificate (TC) if the Issuer Authentication Data is acceptable to the card. Alternatively, the card produces an Application Authentication Cryptogram (AAC) if the Issuer Authentication Data is not acceptable.

K. Issuer Scripts: The issuer may also include Issuer Scripts in its response to the terminal. These are used to perform card management functions, such as unblocking a PIN, as previously described. When used, the Issuer Scripts accompany the Issuer Authentication Data in messages from the issuer, through the card association network, acquirer, and merchant's POS terminal. The terminal passes these scripts to the card for processing. The card may produce Issuer Script Results that are passed back to the issuer in a subsequent capture message.

L. Completion: If the transaction finishes successfully, the merchant has a TC or AAC from the card (see step J, above) indicating the results. The merchant includes the TC and Issuer Script Results in any capture messages sent to the acquirer.

The environment in which the EMV of the prior art operates will now be described with reference to FIG. 1, which depicts the major components and the flow of messages between these components. To make a purchase, the consumer's smart card 100 is inserted into a card reader at a merchant's POS terminal 105. As with traditional credit and debit cards, a purchase using a smart card must be approved before it can be completed. The EMV standard supports two alternative methods of bank approval for each transaction, as previously stated: off-line authorization processing and on-line authorization processing.

Off-line authorization processing is used when the card itself directly approves the transaction. As stated above, this is normally performed for transactions involving small amounts of money where the risk is within a threshold that the merchant and bank are willing to accept. This typically speeds the overall transaction time, since the only interactions 101, 102 needed to complete the authorization occur between the consumer's smart card 100 and the merchant's POS terminal 105. Subsequently, the merchant transmits a capture request to the acquiring bank 110 and the acquiring bank directs the issuing bank 120 to collect the funds associated with the transaction. (A capture request signals the acquiring bank to post the charge to the consumer's account.)

Off-line authorization is not supported in the environment of the present invention, because the consumer's PC cannot be trusted sufficiently for this responsibility. Furthermore, off-line authorization is not necessary when using the present invention, because by definition, the consumer's PC is communicating on the Internet and is therefore on-line.

In the case where on-line processing for payment authorization is required in the prior art, the smart card 100 requests authorization from the issuing bank 120 by sending the request 101 to the merchant's POS terminal 105 which forwards 106 the request to the acquiring bank 110. Acquiring bank 110 then uses an appropriate card network 115 (such as a MasterCard or Visa network) to send 111 the message (i.e. authorization request) to the issuing bank 120 for authorization. The issuing bank 120 then authorizes the purchase or declines the purchase, and sends 112 its response back over the network 115 to the acquiring bank 110, which forwards 107 the response to the merchant's POS terminal 105 and back 102 to the smart card 100. If the transaction is approved, the merchant subsequently transmits a capture request 108 (which is then forwarded to the issuing bank) to collect the funds associated with the transaction. (The authentication and authorization functions occurring in the environment of FIG. 1 are described in more detail with reference to FIGS. 3A and 4.)

Figure 2:
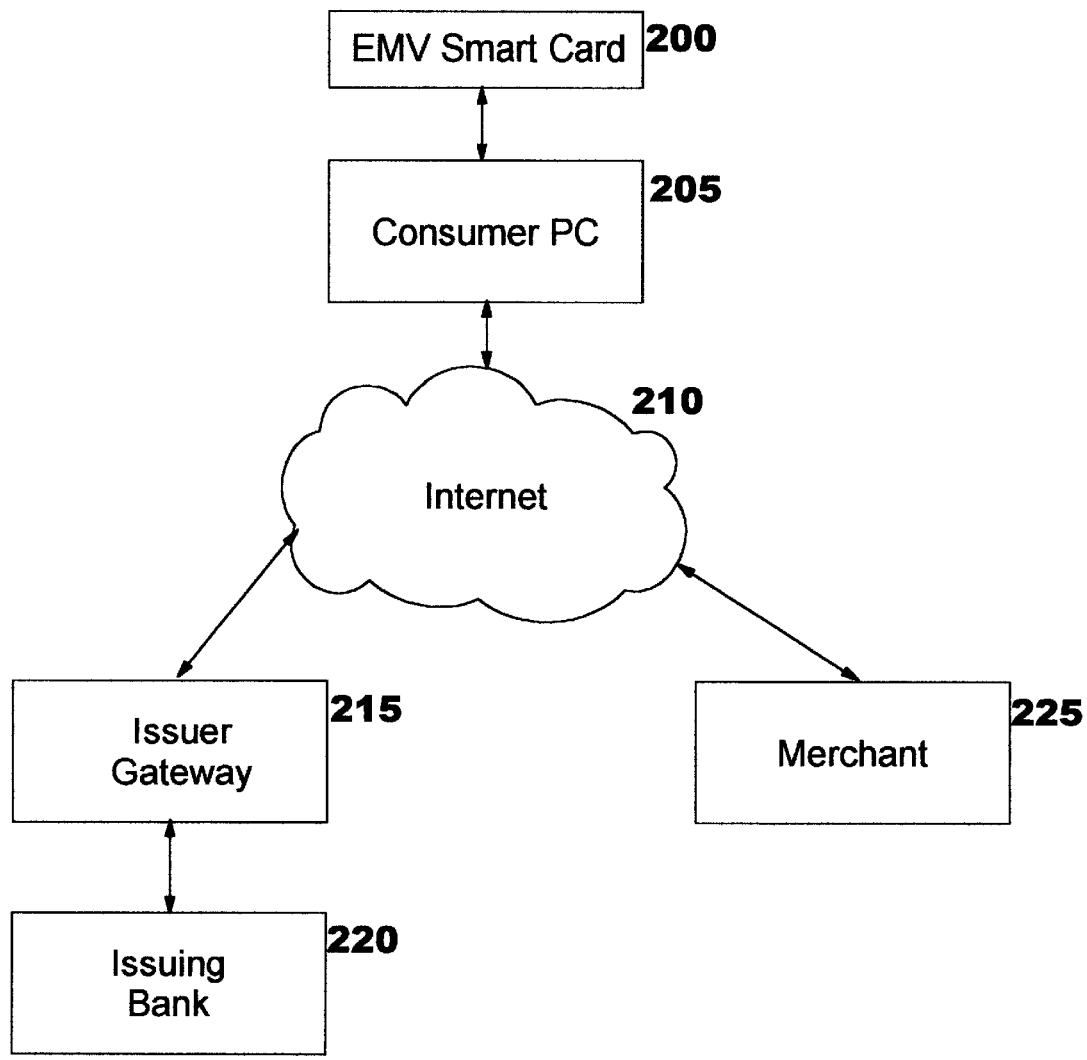
FIG. 2, illustrates the integrated EMV and 4-party protocol environment according to the present invention.

FIG. 2 illustrates the environment in which the integrated EMV and 4-party protocol operates according to the present invention. As discussed earlier, the 4-party protocol takes advantage of the global connectivity of the Internet to allow a consumer PC to obtain payment pre-authorization directly from the consumer's issuing bank rather than using the card authorization procedure described above with reference to Fig. 1. This allows the consumer device to present the card authorization (as an authorization token) along with the payment message to the merchant. One advantage of sending this authorization token with the payment message is that the consumer's account number might not be required to be sent to the merchant. This reduces the exposure of the account number and may thereby reduce the potential for theft by unscrupulous employees working at the merchant location. A further advantage is that pre-authorization considerably simplifies many aspects of the payment protocol and permits much of the consumer function to be operated remotely by the issuing bank.

The technique of performing on-line authorization directly with the issuing bank, according to the present invention, overcomes the untrusted status of the consumer's computing device. (Note that the merchant, acquirer, and card network do not participate in the authorization process when using the present invention.)

As shown in FIG. 2, the consumer's PC 205 is a new component in the integrated EMV environment of the present invention. The PC must have a smart card reader, appropriate software, and connectivity via the Internet 210 to both a merchant 225 and the consumer's issuing bank 220 (or issuer gateway 215). The smart card reader 200 may have a secure PIN keypad;. alternatively, PINs may be entered via the PC keyboard. The consumer's PC 205 must act as the POS terminal to the EMV smart card, implementing the functions (e.g. responding to requests from merchant 225) which are needed to make the EMV card work according to the integrated EMV and 4-party protocol described herein. As has been stated, the PC 205 should not be trusted in the same manner as a POS terminal or ATM, because the PC is under the control of the end-user rather than a merchant or bank. The present invention therefore avoids any dependence upon the PC 205 to perform trust-related functions. Instead, such functions are either deferred to the issuer gateway 215 or issuing bank 220, deferred to the merchant 225, or simplified so that the PC 205 does not make critical processing decisions.

The manner in'which the data authentication function and the authorization function used for EMV processing operates in the prior art, and how these functions operate according to the present invention, will now be described with reference to FIGS. 3A, 3B, 4, and 5.

Figure 3A:
FIG. 3A illustrates the flow of messages for Dynamic Data Authentication in the EMV environment of the prior art.

FIG. 3A illustrates in more detail the processing for dynamic data authentication in EMV according to the prior art. With dynamic data authentication, the smart card 300 can digitally sign data presented to it. The POS terminal 305 provides an unpredictable number and other data to the card as indicated by message 310. The smart card 300 digitally signs a combination of the POS terminal's data and data carried in the smart card, using the unpredictable number to randomize the computation, and sends 315 the result to the POS terminal 305. (Techniques for digitally signing messages to ensure the message's authenticity, and the techniques with which digital certificates are used for protecting the security of electronic messages, are well known in the art and will not be described in detail herein.) The POS terminal verifies the smart card's signature, using a smart card certificate provided by the issuing bank and the issuing bank's certificate provided by one of several known certificate authorities. The public keys of the known certificate authorities used to perform this verification must be pre-stored in the POS terminal. Successful completion of the verification means the smart card is not counterfeit.

Figure 3B:
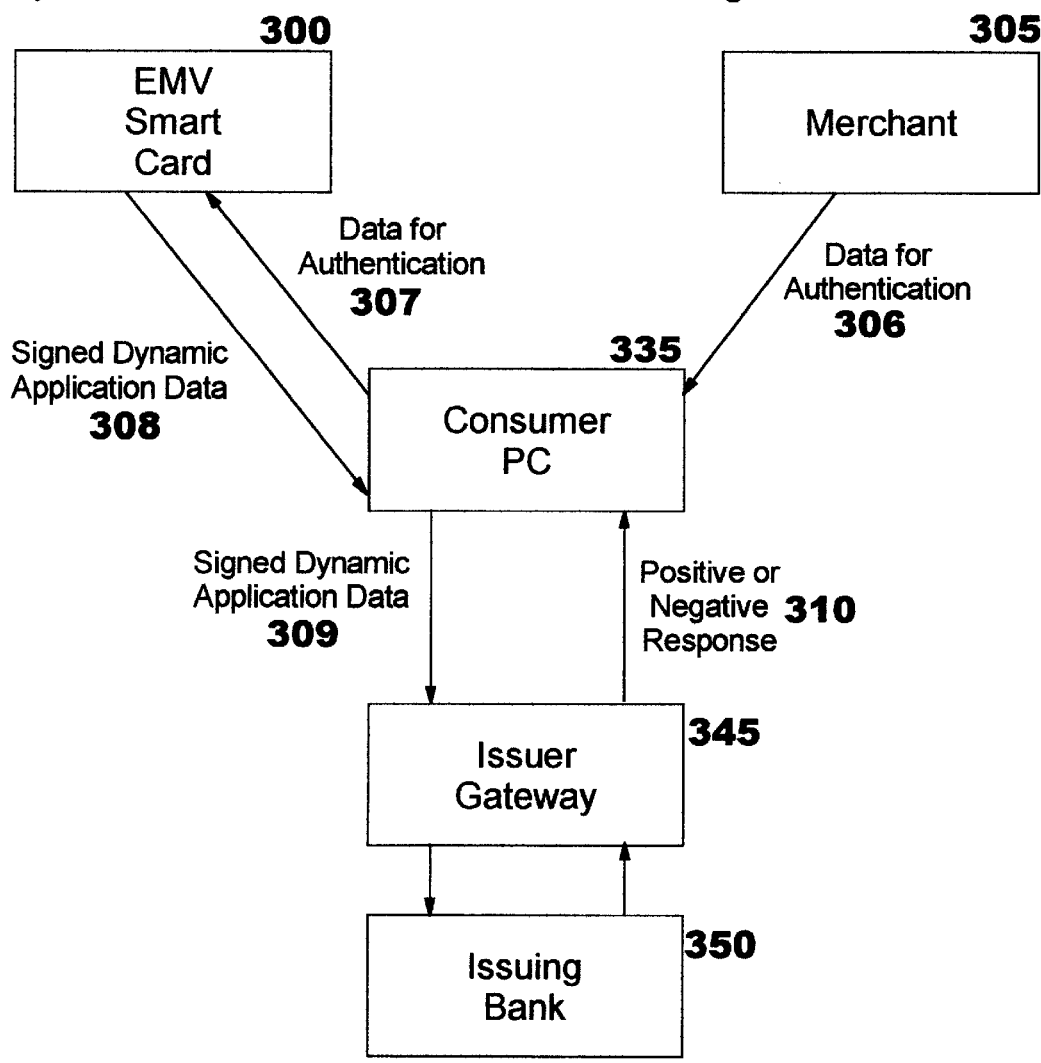
FIG. 3B illustrates the flow of messages for Dynamic Data Authentication according to the present invention.

FIG. 3B illustrates how the analogous processing for dynamic data authentication is performed according to the present invention. To accomplish the same functionality as dynamic data authentication in existing EMV, the merchant 305 sends the data for authentication (as described with reference to FIG. 3A) in message 306 to the consumer's PC 335. This occurs during message flow 705 of the integrated protocol, which will be described in more detail with reference to FIG. 7. The consumer's PC 335 then sends the data for authentication in message 307 to the smart card 300. The smart card 300 then signs the data (as described with reference to FIG. 3A) and returns it 308 to the consumer's PC 335. The data used for static data authentication is also passed from the smart card 300 to the consumer's PC 335. Since the consumer's PC 335 cannot be trusted (from a security perspective), the signed dynamic application data from message 308 (and the static authorization data) is sent in message 309 to the issuing bank 350 via issuer gateway 345. (The function of the present invention which is described herein for performing authorization may be implemented in an issuer gateway connected between the issuing bank and consumer, as shown in FIG. 3B. Alternatively, the issuer gateway may be omitted, in which case this function is implemented in the issuing bank. The following descriptions apply equally whether the function operates at the issuing bank or in an issuer gateway.) This message 309 occurs during message flow 710 of the integrated protocol in FIG. 7. The verification process is performed at the issuer gateway 345, using information from message 309, and either a positive or negative response is produced for the authorization request. This response message 310 is then sent to the consumer's PC 335 (where this message flow 310 corresponds to message flow 715 of FIG. 7).

Thus, the consumer's PC 335 performs similar authentication functions to the merchant POS terminal of existing EMV. In particular, software in the consumer PC handles the receiving of the merchant's data for authentication, the sending of the data for authentication to the smart card, receiving the signed dynamic application data, sending the signed dynamic application data (and the static authentication data) to the issuer gateway, and receiving the response from the issuer gateway. The result of the processing with the integrated protocol is that the smart card has been verified by the issuer gateway or issuing bank (instead of by the merchant, as in the prior art), without any reliance on the trustworthiness of the PC software.

Figure 4:
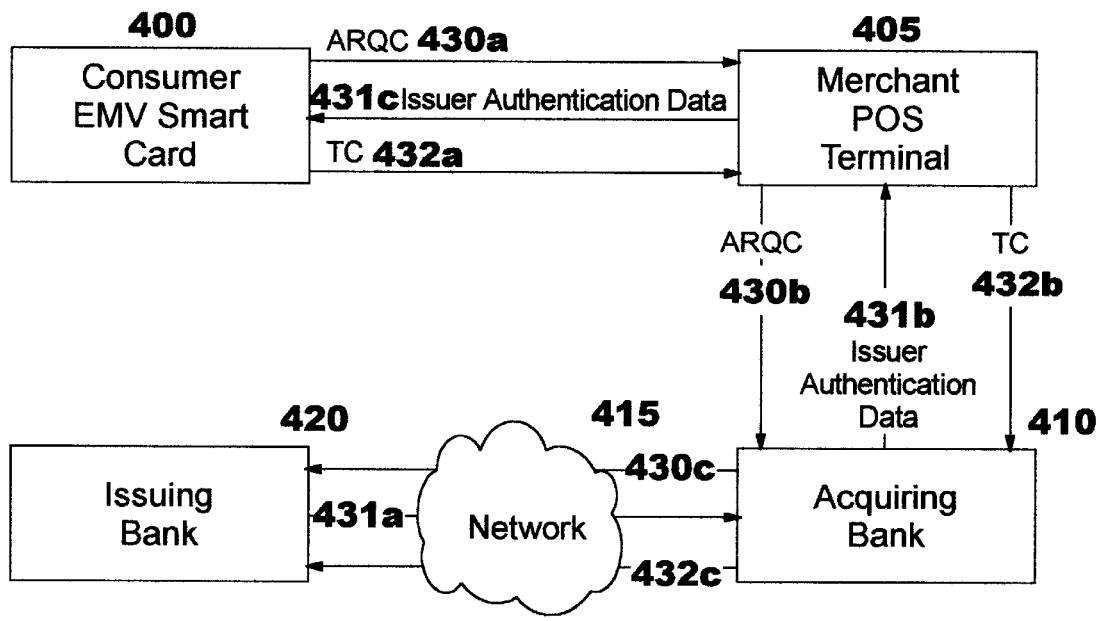
FIG. 4 illustrates the flow of messages for On-line Authorization in the EMV environment of the prior art.

FIG. 4 illustrates the processing for on-line authorization in EMV according to the prior art. The standard EMV process for on-line authorization involves the smart card 400 producing an Authorization Request Cryptogram (ARQC) that is transmitted 430a to the POS terminal 405. This ARQC is sent 430b by the POS terminal to the acquiring bank 410. The ARQC is then sent 430c through the appropriate private card network (i.e. MasterCard or Visa network, etc.) 415 to the issuing bank 420. The issuing bank responds 431a with Issuer Authentication Data which is sent through the card network 415 to the acquiring bank 410. The acquiring bank 410 sends the Issuer Authentication Data 431b to the POS terminal 405. The Issuer Authentication Data is then sent 431c to the smart card 400. The smart card 400 validates the Issuer Authentication Data and, if accepting the transaction, produces a Transaction Certificate (TC) as proof that the transaction was authorized. In effect, the TC substitutes for the cardholder's signature used on a paper transaction. The smart card 400 sends 432a the TC to the POS terminal 405. The POS terminal 405 subsequently forwards the TC 432b to the acquiring bank 410 as a capture request (described earlier). The acquiring bank 410 at some point in time will send 432c the TC to the issuing bank 420 for transfer of the funds for the transaction.

Figure 5:
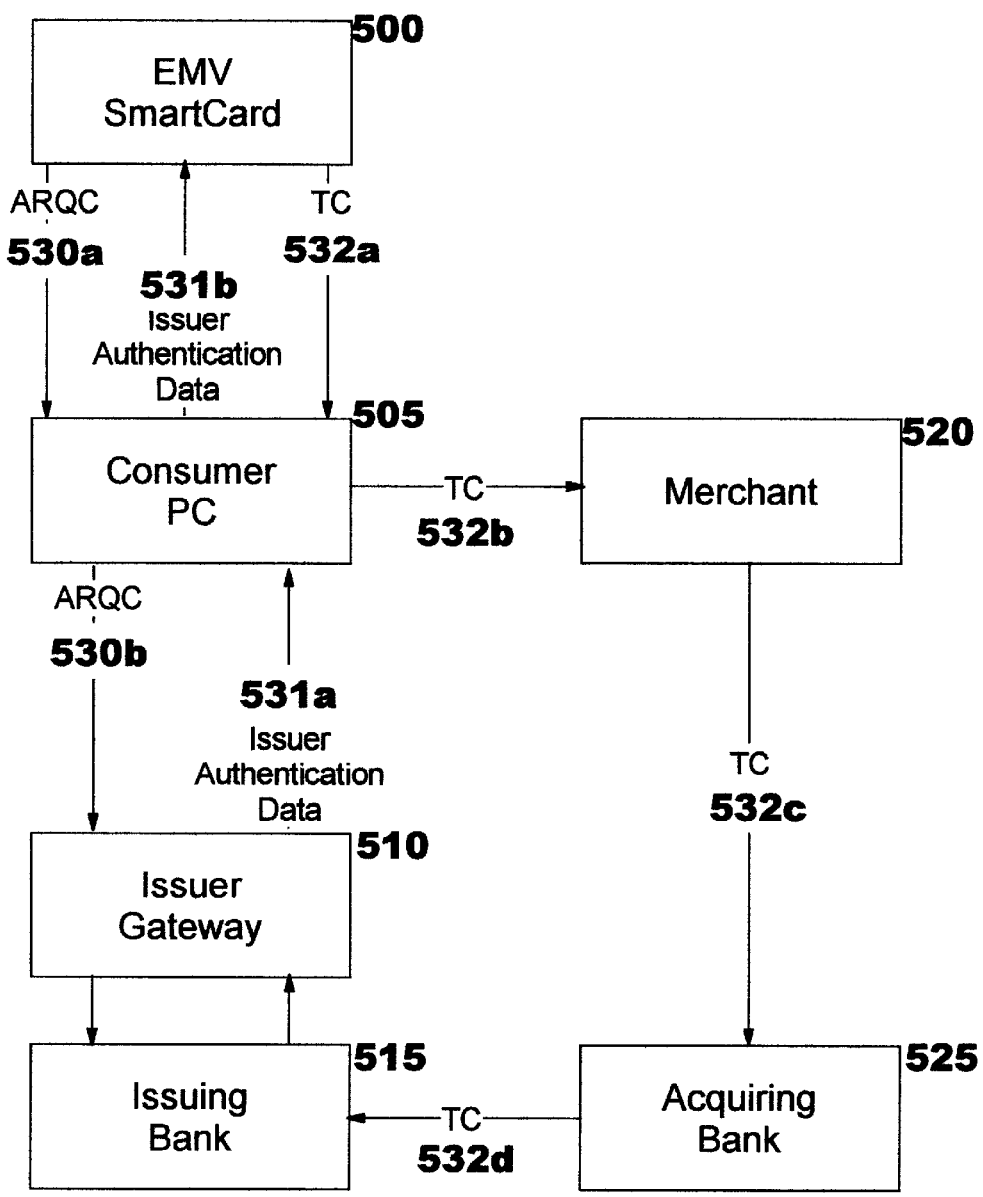
FIG. 5 illustrates the processing for On-line Authorization according to the present invention.

FIG. 5 illustrates how the analogous processing occurs for on-line authorization with the integrated protocol of the present invention, whereby the authorization is performed between the consumer's PC 505 and the issuer gateway 510 (or issuing bank 515, equivalently). An ARQC (as described for FIG. 4) is sent 530a from the consumer's EMV smart card 500 to the consumer's PC 505, instead of sending it directly to the merchant's POS terminal 520 as in the prior art. The consumer's PC 505 forwards 530b the ARQC to the issuer gateway 510 for processing. The issuer gateway 510 (or issuing bank 515) processes the ARQC and creates the issuer authentication data which is sent 531a to the consumer's PC 505. The consumer's PC 505 sends 531b the issuer authentication data to the smart card 500 for processing. The card generates a TC, which is passed 532a to the consumer's PC 505 and is then forwarded 532b to the merchant 520. Thus the merchant receives a pre-authorized payment message which has the same benefits as the TC of the prior art: the TC serves as proof of payment which can be used in a subsequent capture message.

At some point in time, the merchant 520 sends 532c the TC to the acquiring bank 525. The acquiring bank 525 then forwards 532d the TC to the issuing bank 515 for payment.

Figure 6:
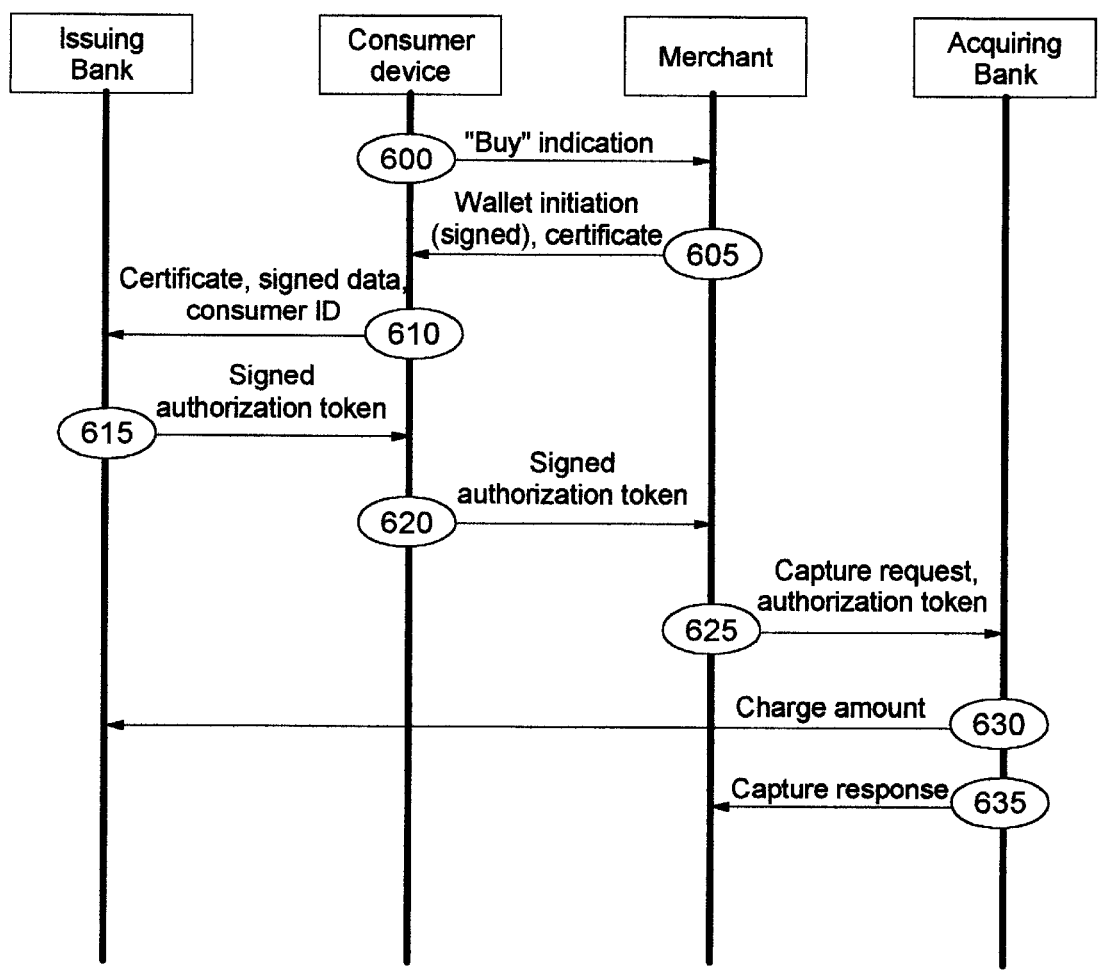
FIG. 6 illustrates the transaction flows of the 4-party protocol of the prior art.
Figure 7:
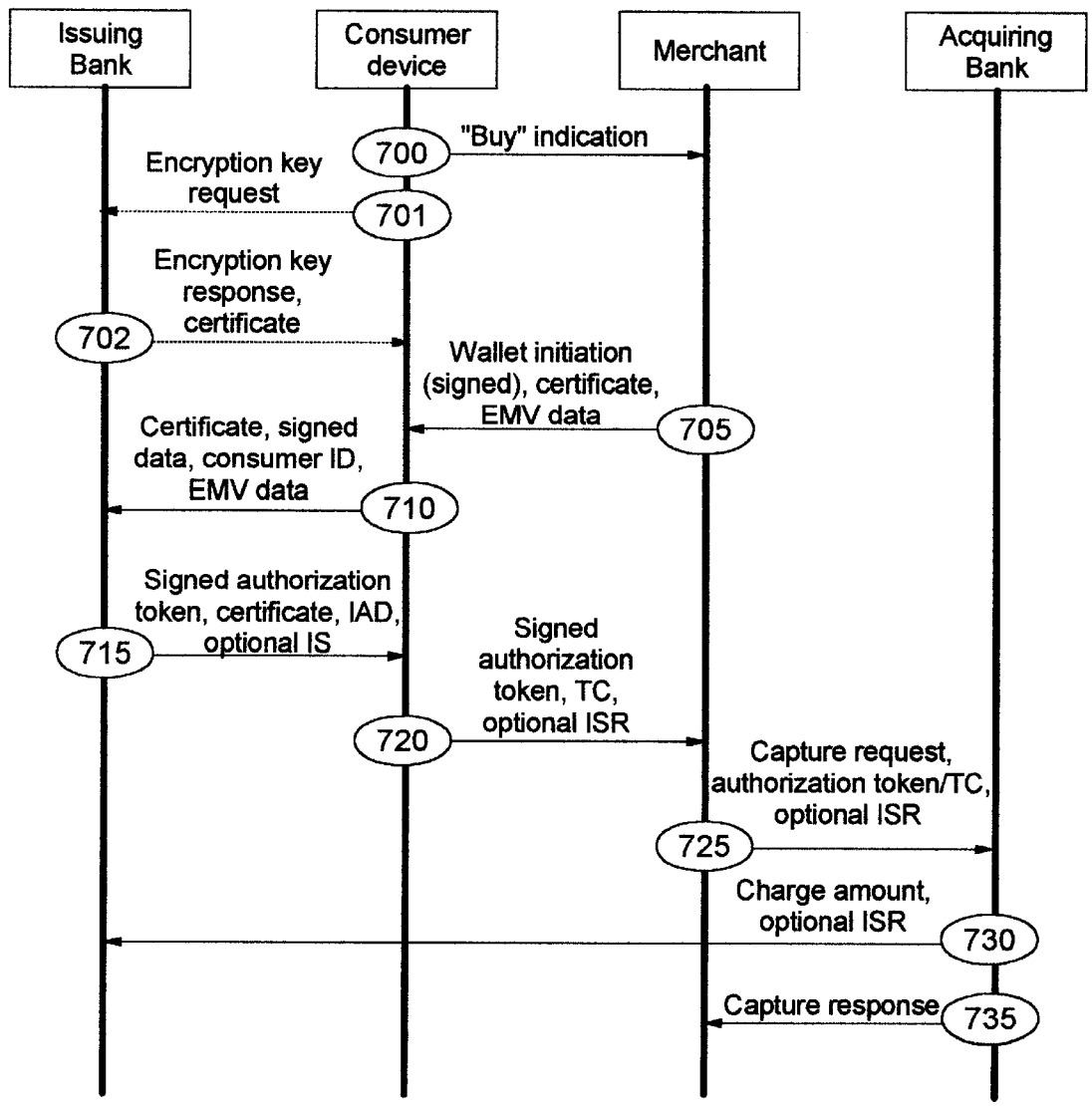
FIG. 7 illustrates the transaction flows when EMV and the 4-party protocol are integrated according to the present invention.

FIG. 6 illustrates the message flows used to implement the 4-party protocol as defined in the related invention. The 4-party protocol was designed for use when purchases are made remotely with a credit or debit card by a consumer connecting his or her PC to a merchant over the Internet. FIG. 7, described below, then illustrates how the present invention integrates this 4-party protocol with EMV to support consumer transactions using smart cards.

The 4-party protocol processing of the related invention is initiated by the consumer using, for example, a browser in his or her personal computer-to purchase a merchant's product through the Internet. Once a selection has been made, the consumer will then select a "buy" button or a "pay" button or other type of selection that indicates that the consumer wishes to buy the product(s) or service(s).

The "buy" indication 600 is then sent to the merchant's Web site. The merchant processes the information (i.e. the consumer's selections), and creates a wallet initiation message. This message typically contains a payment amount, a description of the order, a timestamp, a random nonce, and possibly additional data depending on the requirements of a particular merchant. A random nonce is a random number generated for the purpose of uniquely identifying this transaction, according to the prior art. (This nonce is used in creating the ARQC and authorization token, in order to ensure their freshness. The merchant, rather than the consumer device, generates the nonce, thus providing assurance that the messages which use the nonce are more difficult to forge.) The merchant digitally signs this initiation message using a digital certificate that has been provided to the merchant by the acquiring bank. The signed initiation message and digital certificate are then sent 605 to the consumer.

Receipt of the wallet initiation message 605 causes the consumer's browser (or equivalent software) to start the consumer's wallet (or equivalent) program. The consumer is prompted to log on to the wallet program according to the prior art, where the log on process typically requires the user to enter a user identification and a password, or a smart card, and/or to make use of some other appropriate means (which may include biometrics and/or specialized hardware) of authenticating the consumer. (Note that while the 4-party protocol of the related invention indicates that the card holders may be authenticated by various means, including smart cards, there is no teaching in the related invention of using the smart card for the actual consumer transaction. The latter is the subject of the present invention.) The signed-initiation message is verified by the wallet software. Assuming the verification is successful, the wallet program then sends a message 610 to the issuing bank, where this message includes all the data from the wallet initiation message 605, as well as the consumer's identity and the authentication data from the log-process. Typically, this message 610 is digitally signed by the consumer's wallet program before transmission to ensure that the information cannot be altered. The consumer's digital certificate may also be transmitted with message 610. (Alternatively, the issuing bank may retrieve the consumer's public key from a certificate registry using the consumer's identity to locate the consumer's key and/or certificate.) As an alternative to digitally signing message 610 by the wallet software, the card holder may be authenticated using other means such as with a smart card or password. (As stated above, this use of a smart card for card holder authentication is not the subject of the present invention.)

Note that the descriptions of message flows in FIG. 6 and FIG. 7 refer to sending messages to and from the issuing bank and acquiring bank. It may happen in a particular case that the functions described are implemented in an issuing gateway connected between the issuing bank and consumer, and/or in an acquiring gateway connected between the merchant and acquiring bank. These gateways are not shown in FIG. 6 or FIG. 7 for ease of illustration. However, it will be apparent to one of skill in the art that the following descriptions referring to functions operating in the respective banks may apply equally to functions implemented in these gateways.

The issuing bank, upon receipt of message 610, verifies the merchant's signature using the merchant's digital certificate and validates that the merchant and the issuer share a common financial arrangement such as an association with MasterCard, Visa, an ATM network, or similar financial organization. The issuing bank then verifies the consumer's identity and his account information (e.g. ensuring that the account is still open and is able to accept this charge, etc.), and verifies the consumer's digital signature (or alternative authentication means). Upon successful verification, the issuing bank generates and sends 615 a signed authorization token to the consumer's wallet program, along with the issuing bank's digital certificate. The authorization token typically contains all the data from message 605, plus a merchant identifier and a reference to the consumer's credit or debit card number. (The reference is some type of value which the issuing bank correlates to the card number, as described in the related invention. Sending the reference to the consumer's card number avoids transmitting the card number through the Internet, thereby increasing the security of the transaction.)

The consumer's wallet program forwards 620 the authorization token to the merchant, who can verify the issuing bank's digital signature and the data in the authorization token. Since the issuing bank has created this signed authorization of payment for the consumer's purchase, the merchant does not need to separately request an authorization of credit card information.

At some later time, possibly at the end of the day or even the end of the week, the merchant submits 625 the authorization token in a capture request to the acquiring bank, signaling the acquiring bank to post the charge 630 to the consumer's credit card or to his debit account. As indicated at 635, the acquiring bank sends a capture response message to the merchant. This capture response serves to acknowledge the capture request 625. (Note that a single capture response 635 may acknowledge multiple capture requests, and thus a period of time may elapse before message 635 is transmitted.)

In typical EMV implementations, secure messaging functions ensure that the messages exchanged between the EMV card and the issuer are cryptographically authenticated. In particular, the ARQC, Issuer Authentication Data, and TC are authenticated with keyed Message Authentication Codes (MACs). In the present invention, the MACs ensure that the untrusted PC cannot modify these messages.

The manner in which the 4-party protocol of the related invention is augmented when integrated with EMV to support smart cards, according to the present invention, will now be described with reference to FIG. 7.

With message 700, the consumer indicates that he or she wishes to buy goods or services, or perform a financial transaction, in a similar manner as message 600 of FIG. 6.

Card verification must be performed to ensure that the consumer using the smart card is the authorized cardholder. All forms of card verification previously described, except paper signature, are supported in the integrated protocol. With the integrated protocol, the same prior art EMV procedure described above for off-line PIN processing applies, with the consumer PC substituting for the POS terminal. That is, the PIN is passed to the card for verification: if the wrong PIN is used, the card rejects the transaction and the consumer must start again; otherwise, the card permits the processing to proceed. The PIN encipherment option also works the same way as in the prior art.

If on-line PIN processing is used, the consumer is prompted to enter a PIN either via the standard PC keyboard, or via a special secure PIN keypad. The PIN must be encrypted for secure transmission to the issuing bank. According to the preferred embodiment, the security technique. used for encrypting a PIN to be transmitted to the issuer for on-line PIN processing is changed from the technique used in existing EMV implementations. As stated earlier, existing EMV uses standard ISO 9564 PIN security management for on-line PIN processing. DES symmetric-key encryption is therefore used in this existing approach, where a shared secret key is maintained by each party to a transmission and used for encrypting and decrypting the data transmitted. From a security viewpoint, it is preferable to use asymmetric (public key) cryptography with the present invention because of the presence of the consumer PC.. (That is, symmetric cryptography would require long-term storage of a secret key in an untrusted device. This is not the case if public key cryptography is used.)

One way in which public key encryption may be performed for the present invention is by obtaining an encryption key through two message flows which are added to the 4-party protocol. In new message 701, the consumer PC sends an encryption key request to the issuing bank. In new message 702, the issuing bank returns an encryption key response containing a new issuer encryption certificate certified in the certificate hierarchy being used. The consumer PC verifies this certificate, prompts the user for the PIN, and encrypts the PIN using the public key contained in the issuer encryption certificate. The consumer PC includes this encrypted PIN in the 4-party authorization request transmitted to the issuing bank in message 710. The issuing bank decrypts and then verifies the PIN. It rejects the authorization (in message flow 715) if the PIN is not correct. (Note that while messages 701 and 702 are depicted as occurring after message 700, they may alternatively be performed prior to message 700 or after message 705, without deviating from the scope of the present invention.)

Alternatively, the encryption key used for on-line PIN processing may be obtained by statically and permanently providing an issuer public key directly in the wallet software (and thereby omitting messages 701 and 702). In this case, the wallet would encrypt the on-line PIN using the issuer public encryption key, and proceed as described above for messages 710 and 715 (where the issuer decrypts the PIN using the matching private key).

In the augmented wallet initiation message 705 used by the present invention, the wallet initiation message anticipates and includes any data required in the EMV card's Processing Data Options List (PDOL), which has been previously described. Payment amount and timestamp are already included in the 4-party wallet initiation message. Brand, Merchant Identifier, and Acquirer Identifier can either be included as additional fields in wallet initiation message 705, or obtained from the merchant's digital certificate (which is preferably already included therein). Because these identifiers are brand-specific, however, the consumer preferably specifies the card brand he or she intends to use via an element on the merchant's on-line shopping screens before pressing the pay or buy button. (See the optional variation of the preferred embodiment, described below, for alternative ways for the consumer to select the payment brand.)

After wallet initiation message 705 causes the consumer's wallet to start, the consumer is prompted to insert an EMV smart card in the smart card reader. The wallet initiates the EMV application, and reads the application data—including the primary account number—from the card. The wallet verifies that the brand coded in the primary account number obtained from the card matches the brand in the wallet initiation message 705.

Note that the consumer's PC must know the network address of the issuer gateway in order to transmit messages 701 and 710. One way to accomplish this is to store the Uniform Resource Locator (URL) or network address of the issuing bank in the smart card. As an alternative, the consumer PC software could use the account number to look up this URL from a Web site or Internet directory. (The latter concept is addressed in "ISO 7812/7816 Based Card Numbers and the Domain Name System (DNS)", an Internet Engineering Task Force (IETF) draft edited by Donald Eastlake and dated Aug. 19,1999.)

Because the consumer's PC cannot be trusted to perform the Data Authentication, Processing Restrictions, and Terminal Risk Management steps of standard EMV, the present invention places these responsibilities on the issuer. Additional information for performing these functions is transmitted (along with the previously-described wallet initiation message 705 information) to the issuer in message 710. In particular, EMV signed static application data, dynamic application data, and any data required for evaluating the processing restrictions is added to message 710. If the card performs Dynamic Data Authentication, the wallet preferably uses the random nonce from the wallet initiation message as the Unpredictable Number. The wallet forces the smart card to use On-line Authorization through parameters sent on the GENERATE AC command. The card then produces an ARQC, which the wallet also includes in the request message 710 sent to the issuing bank. This ARQC is used by the issuing bank to authenticate the card holder.

The wallet sends the data from the wallet initiation message 705, plus the EMV data which has been described, to the issuing bank in message 710.

The issuer performs verification processing upon receiving message 710, similar to that described for message 610 of FIG. 6. In addition, the issuer validates the Signed Static or Dynamic Application Data from the augmented information in message 710. For dynamic data authentication, the issuer uses the data from the wallet initiation message 705, forwarded to the issuer in message 710, to validate the Signed Dynamic Application Data. The issuer then evaluates any Processing Restrictions, as part of its decision whether to respond positively or negatively to the PC in message flow 715. The issuer also validates the ARQC, as in the prior art.

If on-line PIN processing is used, the issuer decrypts the PIN, re-encrypts it according to ISO 9564 to meet interface requirements, and includes the encrypted PIN in the authorization request to the issuer's card processing system. If the is[]suer's card processing system approves the transaction, the issuer generates and sends a signed authorization token to the consumer wallet, along with the issuer's certificate, in message 715. The authorization token contains the data originally passed on the wallet initiation message 705, plus a merchant identifier and a reference to the consumer's smart card number. The issuer also generates Issuer Authentication Data and may optionally generate Issuer Scripts, and includes this information in message 715. (Note that any Issuer Scripts created by the issuing bank pass directly back to the consumer's PC in message 715 and then to the EMV card, thereby supporting the Issuer Scripts function with a more direct communications path than in standard EMV.)

Upon receiving message 715, the consumer's wallet passes the Issuer Authentication Data and any Issuer Scripts to the card. The card then generates a TC if the Issuer Authentication Data is acceptable, or produces an AAC otherwise. The card processes any Issuer Scripts according to the prior art, and may generate Issuer Script Results. The wallet retrieves the TC and Issuer Script Results, if any, from the smart card for forwarding to the merchant. The wallet then sends the TC, any Issuer Script Results, and the authorization token to the merchant in message 720. The merchant then verifies the issuer's signature, the data in the authorization token, and the TC. Note that no separate real-time authorization is required since the payment is pre-authorized before it reaches the merchant. Furthermore, the TC represents proof of payment by the consumer, should the transaction be disputed. The merchant may rely upon these indicia as a guarantee for payment, and no further reference to a bank is needed for authorization.

At some later time, the merchant submits the authorization token and/or the TC in a capture request 725 which is sent to the acquirer's payment gateway (or to the acquiring bank). The capture request tells the acquirer to post the charge to the consumer's account, as described above with reference to message 625 of FIG. 6. A message 730 is sent over the card network to the issuing bank, notifying the issuer to transfer the funds. Any Issuer Script Results which were created by the card and sent to the merchant in message 720 are also forwarded to the acquirer in message 725, and included with message 730. Finally, the acquiring bank sends a capture response message 735 to the merchant to acknowledge the capture request 735, as described above for message 635.

In the preferred embodiment which has been described, the consumer explicitly selects the brand he or she wishes to use via the merchant's on-line shopping screen so that brand-dependent data can be included in the wallet initiation message. (This brand-dependent data includes the Merchant Identifier, Acquirer Identifier, and possibly the merchant's certificate and signature, as described above.) In an optional variation of the preferred embodiment, the consumer's choice of smart card may implicitly select the brand which the consumer wishes to use. This may be accomplished by several alternative techniques.

In a first technique, the merchant could send multiple tuples of data to the consumer's wallet—one tuple for each brand accepted by the merchant. Each tuple would contain a brand name, a merchant identifier, and an acquirer identifier. After the consumer inserts a smart card in the card slot, the wallet would read the account number from the card, and use ISO account numbering rules to match the account number to the brand. (For example, if the account number begins with the number "4", it is a Visa account; if it begins with a "5", it is a MasterCard account; etc.) The wallet would select the Merchant Identifier and Acquirer Identifier from the tuple with the matching brand.

In a second technique, the tuple described above could contain ISO account number prefixes for brand names. The account number prefixes would match the first one or more digits of the card account numbers. This technique provides an alternate way to match brands, as understood by the merchant and consumer, to account numbers as provided on an EMV card.

In a third technique, an additional message exchange could be made between the wallet and merchant. First, the merchant would send the wallet initiation message, as described in the original 4-party design (see the description of message 605, above). Second, the consumer could insert the EMV card, and the wallet would read the account number from the card. Third, the wallet would send a new message to the merchant, with the brand name or the first few digits from the account number. Finally, the merchant would send a new response message back to the wallet. This response message would contain the appropriate Merchant Identifier and Acquirer Identifier, according to the brand of the EMV card. If the merchant certificate and signature are brand-dependent, then these can also be sent to the wallet in this additional response message.

In a fourth technique, an EMV feature referred to as "Application Identifiers", or "AIDs", may be used to select a brand. AIDs indicate which applications (i.e. optional functions) are installed on a particular smart card. Individual AIDs are allocated for specific brands. For example, there is an AID which means "this card works with MasterCard". Thus, the merchant may transmit the AID of the appropriate card brand in the associated tuple, such that one or more tuples of the form (AID, merchant identifier, acquirer identifier) are sent to the wallet software. One such tuple is preferably sent for each brand accepted by the merchant. The wallet then reads the AIDs supported by the smart card, and matches these against the tuples received from the merchant to find the intersection. If the intersection is empty, then the smart card is not usable with this merchant. If the intersection has one entry, then the wallet selects that entry. If the intersection has multiple entries, then the wallet preferably asks the consumer which brand to use.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. A computer program product for enabling use of a smart card by a consumer using a consumer device for trusted transactions in a networking environment in which the consumer's device is untrusted and is communicably coupled over a public network to a merchant computer of a merchant and to an issuer computer of an issuer of the smart card and in which the merchant computer communicates with an acquirer computer of an acquirer that is distinct from the issuer and that processes payments for the merchant, the computer program product embodied on one or more computer readable media readable by one or more computing systems in the networking environment and comprising:

computer-readable program code means for initiating a transaction with the merchant computer from the consumer device; and computer-readable program code means for providing, directly from the consumer device to the merchant computer, a payment authorization for the transaction, further comprising:

computer-readable program code means for sending, via the consumer device, an authorization request message directly from the smart card to the issuer computer;

computer-readable program code means for obtaining, at the consumer device, an authorization token from an authorization response when the issuer computer is authorizing payment for the transaction, wherein the authorization response is sent directly from the issuer computer to the consumer device, responsive to receiving and processing the authorization request message at the issuer computer; and computer-readable program code means for including the authorization token thereby signifying the payment authorization, in a payment message which corresponds to the transaction and which is sent directly from the consumer device to the merchant computer; and computer-readable program code means for verifying, by the merchant computer upon receiving the payment message, that the issuer computer has authorized the payment by authenticating an issuer digital signature on the authorization token, wherein the issuer digital signature was created by the issuer computer using a digital certificate of the issuer, such that the merchant computer does not need to communicate with the issuer computer or the acquirer computer to determine whether the payment is authorized.

2. The computer program product according to claim 1, wherein the computer-readable program code means for initiating the transaction further comprises:

computer-readable program code means or sending a transaction request from the consumer device to the merchant computer;

computer-readable program code means for receiving the transaction request at the merchant computer; and computer-readable program code means for sending a payment initiation message for the transaction, responsive to the computer-readable program code means for receiving the transaction request, from the merchant computer to the consumer device, wherein the payment initiation message comprises a transaction amount, a timestamp, a random nonce, and data required by the smart card, wherein operation of the computer-readable program code means for providing the payment authorization is triggered by receiving the sent payment initiation message at the consumer device.

3. The computer program product according to claim 2, wherein the payment initiation message is a wallet initiation message, and further comprising:

computer-readable program code means for invoking a wallet program upon receipt of the sent payment initiation message at the consumer device, wherein the wallet program prompts the consumer to insert the smart card into a smart card reader operably attached to the consumer device.

4. The computer program product according to claim 2, wherein the payment initiation message is digitally signed by the merchant computer using a digital certificate of the merchant, and further comprising:

computer-readable program code means for verifying the digitally signed payment initiation message, by the issuer computer, using the digital certificate of the merchant, thereby ensuring that the payment initiation message was created by the merchant computer.

5. The computer program product according to claim 1, wherein the computer-readable program code means for sending the authorization request message further comprises:

computer-readable program code means for sending a message from the consumer device to the smart card, causing the smart card to use an on-line authorization process whereby the issuer computer must be contacted for authorizing payment for the transaction;

computer-readable program code means for receiving, at the consumer device, an authorization request (AR) sent from the smart card responsive to receiving the message from the consumer device, wherein the AR comprises a card account number of the smart card, an amount of the transaction, a date of the transaction, and a serial number of the smart card; and computer-readable program code means for creating the authorization request message by including the AR with information received by the consumer device in a payment initiation message sent to the consumer device from the merchant computer.

6. The computer program product according to claim 1, further comprising:

computer-readable program code means for passing the authorization token from the consumer device to the smart card; and computer-readable program code means for evaluating the authorization token by the smart card to determine whether to accept the transaction, and if so, creating a transaction certificate (TC) as proof that the transaction was accepted, wherein the computer-readable program code means for including the authorization token in the payment message only operates if the consumer device receives the TC from the smart card, and wherein the TC is also included in the payment message.

7. The computer program product according to claim 6, further comprising:

computer-readable program code means for digitally signing the TC by the smart card using a smart card digital certificate; and computer-readable program code means for verifying the digitally signed TC, by the merchant computer, using the smart card digital certificate, thereby ensuring that the TC was created by the smart card.

8. The computer program product according to claim 1, further comprising:

computer-readable program code means for requesting, at the consumer device, an issuer public key from the issuer computer;

computer-readable program code means for using the issuer public key to encrypt a personal identification number (PIN) to be transmitted to the issuer computer from the consumer device in the authorization request message; and computer-readable program code means for using an issuer private key corresponding to the issuer public key to decrypt the PIN by the issuer computer while processing the authorization request message, thereby ensuring that the PIN was transmitted from the consumer device.

9. The computer program product according to claim 1, further comprising:

computer-readable program code means for using an issuer public key which has been statically and permanently provided in the consumer device to encrypt a personal identification number (PIN) to be transmitted to the issuer computer from the consumer device in the authorization request message; and computer-readable program code means for using an issuer private key corresponding to the issuer public key to decrypt the PIN by the issuer computer while processing the authorization request message, thereby ensuing that the PIN was transmitted from the consumer device.

10. The computer program product according to claim 1, wherein the processing of the authorization request message at the issuer computer further comprises:

computer-readable program code means for verifying a card account number specified in the authorization request message;

computer-readable program code means for verifying an ability of an account corresponding to the card account number to cover an amount specified in the authorization request message;

computer-readable program code means for creating the authorization token to authorize transaction if the computer-readable program code means for verifying the card account number and the ability to cover the amount have a positive result; and computer-readable program code means for sending the authorization token from the issuer computer to the consumer device in the authorization response; and computer-readable program code means for receiving the sent authorization token, in the authorization response, at the consumer device.

11. The computer program product according to claim 1, further comprising:

computer-readable program code means for sending a capture request from the merchant computer to the acquirer computer, responsive to a successful outcome of the computer-readable program code means for verifying, wherein the capture request asks the acquirer computer to obtain payment for the transaction from the issuer;

computer-readable program code means for receiving the capture request at the acquirer computer;

computer-readable program code means for forwarding the received capture request from the acquirer computer to the issuer computer; and computer-readable program code means for charging, responsive to receiving the forwarded capture request at the issuer computer, an account corresponding to the smart card for the transaction.

12. A system for enabling use of a smart card by a consumer using a consumer device for trusted transactions in a networking environment in which the consumer's consumer device is untrusted and is communicably coupled over a public network to a merchant computer of a merchant and to an issuer computer of an issuer of the smart card and in which the merchant computer communicates with an acquirer computer of an acquirer that is distinct from the issuer and that processes payments for the merchant, comprising:

means for initiating a transaction with the merchant from the consumer device;

means for obtaining, at the consumer device, a payment authorization for the transaction directly from the issuer computer, further comprising:

means for sending a message from the consumer device to the smart card, causing the smart card to use an on-line authorization process whereby the issuer computer must be contacted for authorizing payment for the transaction;

means for receiving, at the consumer device, an authorization request (AR) sent from the smart card responsive to receiving the message from the consumer device, wherein the AR comprises a card account number of the smart card, an amount of the transaction, a date of the transaction, and a serial number of the smart card;

means for creating an augmented authorization request message by augmenting a payment initiation message, received for the transaction by the consumer device from the merchant computer, with the AR;

means for sending the augmented authorization request message directly from the consumer device to the issuer computer;

means for receiving the sent augmented authorization request message at the issuer computer;

means operable at the issuer computer, responsive to the means for receiving the sent augmented authorization request message, for creating an authorization token for the transaction when the issuer computer is authorizing payment for the transaction;

means for sending the authorization token from the issuer computer directly to the consumer device as the payment authorization; and means for receiving the sent authorization token at the consumer device;

means for including the authorization token as the payment authorization in a payment message which corresponds to the transaction and which is sent directly from the consumer device to the merchant computer; and means for authenticating, by the merchant computer, an issuer digital signature in the payment message, wherein the issuer digital signature was created by the issuer computer over the payment authorization using a digital certificate of the issuer, such that the merchant computer does not to communicate with the issuer computer or the acquirer computer to determine whether the payment is authorized.

13. The system according to claim 12, wherein the means for initiating the transaction further comprises:

means for sending a transaction request from the consumer device to the merchant computer;

means for receiving the transaction request at the merchant computer; and means for sending a payment initiation message for the transaction, responsive to the means for receiving the transaction request, from the merchant computer to the consumer device, wherein the payment initiation message comprises a transaction amount, a timestamp, a random nonce, and data required by the smart card, wherein operation of the means for obtaining the payment authorization is triggered by receiving the sent payment initiation message at the consumer device.

14. The system according to claim 13, wherein the payment initiation message is a wallet initiation message, and further comprising:

means for invoking a wallet program upon receipt of the sent payment initiation message at the consumer device, wherein the wallet program prompts the consumer to insert the smart card into a smart card reader operably attached to the consumer device.

15. The system according to claim 13, wherein the payment initiation message is digitally signed by the merchant computer using a digital certificate of the merchant and further comprising:

means for verifying the digitally signed payment initiation message, by the issuer computer, using the digital certificate of the merchant, thereby ensuring that the payment initiation message was created by the merchant computer.

16. The system according to claim 12, wherein:

the means for creating the authorization token for the transaction further comprises:

means for verifying the card account number specified in the augmented authorization request message;

means for verifying an ability of an account corresponding to the card account number to cover the amount specified in the augmented authorization request message; and means for creating the authorization token if the means for verifying the card account number and the ability to cover the amount have a positive result.

17. The system according to claim 12, further comprising:

means for passing the authentication token from the consumer device to the smart card; and means for evaluating the authorization token by the smart card to determine whether to accept the transaction, and if so, creating transaction certificate (TC) as proof that the transaction was accepted, wherein the means for including the authorization token in the payment message only operates if the consumer device receives the TC from the smart card, and wherein the TC is also included in the payment message.

18. The system according to claim 17, further comprising:

means for digitally signing the TC by the smart card using a smart card digital certificate; and means for verifying the digitally signed TC, by the merchant computer, using the smart card digital certificate, thereby ensuring that the TC was created by the smart card.

19. The system according to claim 12, further comprising:

means for requesting, at the consumer device, an issuer public key from the issuer computer;

means for using the issuer public key to encrypt a personal identification number (PIN) to be transmitted to the issuer computer from the consumer device in the augmented authorization request message; and means for using an issuer private key corresponding to the issuer public key to decrypt the PIN by the issuer computer while determining whether to authorize the payment, thereby ensuring that the PIN was transmitted from the consumer device.

20. The system according to claim 12, further comprising:

means for using an issuer public key which has been statically and permanently provided in the consumer device to encrypt a personal identification number (PIN) to be transmitted to the issuer computer from the consumer device in the augmented authorization request massage; and means for using an issuer private key corresponding to the issuer public key to decrypt the PIN by the issuer computer while determining whether to authorize the payment, thereby ensuring that the PIN was transmitted from the consumer device.

21. A method for enabling use of a smart card by a consumer using a consumer device for trusted transactions in a networking environment in which the consumer's consumer device is untrusted and is communicably coupled over a public network to a merchant computer of a merchant and to an issuer computer of an issuer of the smart card and in which the merchant computer communicates with an acquirer computer of an acquirer that is distinct from the issuer and that processes payments for the merchant, comprising the steps of:

initiating a transaction with the merchant computer from the consumer device;

obtaining, at the consumer device, an authorization token from an authorization response when the issuer computer is authorizing payment for the transaction, wherein the authorization response is sent directly from the issuer computer to the consumer device;

including the authorization token, thereby signifying that payment for the transaction is authorized, in a payment message which corresponds to the transaction and which is sent directly from the consumer device to the merchant computer; and verifying, by the merchant computer upon receiving the payment message, that the issuer computer has authorized the payment by authenticating an issuer digital signature on the authorization token, wherein the issuer digital signature was created by the issuer computer using a digital certificate of the issuer, such that the merchant computer does not need to communicate with the issuer computer the acquirer computer to determine whether the payment is authorized.

22. The method according to claim 21, wherein the step of initiating the transaction further comprises the steps of:

sending a transaction request from the consumer device to the merchant computer;

receiving the transaction request at the merchant computer; and sending a payment initiation message for the transaction, responsive to the step of receiving the transaction request, from the merchant computer to the consumer device, wherein the payment initiation message comprises a transaction amount, a timestamp, a random nonce, and data required by the smart card, wherein operation of the step of obtaining the authorization token is triggered by receiving the sent payment initiation message at the consumer device.

23. The method according to claim 22, wherein the payment initiation message is a wallet initiation message, and further comprising the steps of:

invoking a wallet program upon receipt of the sent payment initiation message at the consumer device, wherein the wallet program prompts the consumer to insert the smart card into a smart card reader operably attach the consumer device.

24. The method according to claim 22, wherein the payment initiation message is digitally signed by the merchant computer using a digital certificate of the merchant, and further comprising the steps of:

verifying the digitally signed payment initiation message, by the issuer computer, using the digital certificate of the merchant, thereby ensuring that the payment initiation message was created by the merchant computer.

25. The method according to claim 21, wherein the step of obtaining the authorization token further comprises the steps of:

sending a message from the consumer device to the smart card, causing the smart card to use an on-line authorization process whereby the issuer computer must be contacted for authorizing payment for the transaction;

receiving, at the consumer device, an authorization request (AR) sent from the smart card responsive to receiving the message from the consumer device, wherein the AR comprises a card account number of the smart card, an amount of the transaction, a date of the transaction, and a serial number of the smart card;

creating an authorization request message by including the AR with information received by the consumer device in a payment initiation message sent to the consumer device from the merchant computer;

sending the authorization request message directly from the consumer device to the issuer computer;

receiving the sent authorization request message at the issuer computer;

creating, at the issuer computer, responsive to the step of receiving the sent authorization request message, the authorization token for the transaction, further comprising the steps of:

verifying the card account number specified in the authorization request message;

verifying an ability of an account corresponding to the card account number to cover the amount specified in the authorization request message; and authorizing the transaction if the steps of verifying the card account number and the ability to cover the amount have a positive result;

sending the authorization token, in the authorization response, from the issuer computer to the consumer device; and receiving the sent authorization token, in the authorization response, at the consumer device.

26. The method according to claim 21, further comprising the steps of:

passing the authorization token from the consumer device to the smart card; and evaluating the authorization token by the smart card to determine whether to accept the transaction, and if so, creating a transaction certificate (TC) as proof that the transaction was accepted, wherein the step of including the authorization token in the payment message only operates if the consumer device receives the TC from the smart card, and wherein the TC is also included in the payment message.

27. The method according to claim 26, further comprising the steps of:
  digitally signing the TC by the smart card using a smart card digital certificate; and
  verifying the digitally signed TC, by the merchant computer, using the smart card digital certificate, thereby ensuring that the TC was created by the smart card.

28. The method according to claim 21, further comprising the steps of:
  requesting, at the consumer device, an issuer public key from the issuer computer;
  using the issuer public key to encrypt a personal identification number (PIN) to be transmitted to the issuer computer from the consumer device in an authorization request message that request the issuer computer to authorize payment for the transaction; and
  using an issuer private a private issuer key corresponding to the issuer public key to decrypt the PIN by the issuer computer while processing the authorization request message, thereby ensuring that the PIN was transmitted from the consumer device.

29. The method according to claim 21, further comprising the steps of:
  using an issuer public key which has been statically and permanently provided in the consumer device to encrypt a personal identification number (PIN) to be transmitted to the issuer computer from the consumer device in an authorization request message that requests the issuer computer to authorize payment for the transaction; and
  using an issuer private key corresponding to the issuer public key to decrypt the PIN by the issuer computer while processing the authorization request message, thereby ensuring that the PIN was transmitted from the consumer device.

30. The method according to claim 21, further comprising the step of selecting a brand of payment to use for the transaction, further comprising the steps of:
  sending, by the merchant computer to the consumer device, one or more tuples of information representing brands which me accepted by the merchant;
  receiving, at the consumer device, the one or more tuples of information;
  comparing at the consumer device, the tuples against one or more brands supported by the consumer device to find one or more matching brands, wherein the selected brand is selected from the one or more matching brands.

31. A method for using smart cards to perform trusted transactions with untrusted computing devices in a public networking environment, comprising the steps of:
  providing a smart card reader function for an untrusted computing device;
  initiating, by a user of the computing device, a transaction with a merchant;
  reading a selected smart card with the smart card reader function, wherein the selected smart card is to be used for a debit or credit of the transaction;
  receiving merchant information from a computer of the merchant, responsive to the initiating step, wherein the merchant information comprising an identification of the merchant and a merchant digital signature;
  causing the computing device to send the merchant information along with authorization information pertaining to the smart card and the transaction directly to an issuer computer of an issuer of the smart card, wherein the authorization information comprises an amount of the transaction, an account number to use for the debit or credit or a reference to the account number, a date of the transaction, and a serial number of the smart card,
  verifying, by the issuer computer, the merchant digital signature;
  determining, by the issuer computer, whether to authorize the transaction using the authorization initiation;
  returning an authorization token from the issuer computer to the computing device if the determining has a positive result, wherein the authorization token comprises the authorization information and the merchant information and wherein the authorization token is digitally signed by the issuer computer;
  forwarding the authorization token from the computing device to the smart card;
  creating, by the smart card, a transaction completion indication if the authorization token is acceptable to the smart card;
  forwarding the transaction completion indication and authorization token through the computing device to the merchant computer, thereby signifying that a payment for the transaction is authorized;
  receiving, by the merchant computer, the transaction completion indication and authorization token; and
  accepting the transaction, by the merchant, if the issuer's digital signature of the authorization token is successfully verified, thereby avoiding a need for the merchant, or an acquirer that process payments for the merchant, to contact the issuer to determine whether payment for the transaction is authorized.

32. The method according to claim 31, wherein the accepting step further comprises the steps of:
  sending, by the merchant computer, a capture request to an acquirer computer of the acquirer, thereby signaling the acquirer computer to acquire the payment funds authorized for the transaction, wherein the capture request comprises one or both of (1) the authorization token and (2) the transaction completion indication;
  notifying the issuer computer, by the acquirer computer, to transfer the payment to an account of the merchant, responsive to receiving the capture request at the acquirer computer; and
  transferring the payment to the merchant's account, by the acquirer computer, the transfer having been pre-authorized by the authorization token.

* * * * *